Nov. 7, 1933.    S. HERMANSON    1,934,065

METHOD OF MAKING LINED NOZZLES

Filed Oct. 5, 1931

INVENTOR.

Sune Hermanson

BY *Olwin A. Andrus*

ATTORNEY.

Patented Nov. 7, 1933

1,934,065

UNITED STATES PATENT OFFICE 1,934,065

METHOD OF MAKING LINED NOZZLES

Sune Hermanson, Milwaukee, Wis., assignor to A. O. Smith Corporation, Milwaukee, Wis., a corporation of New York Application October 5, 1931. Serial No. 567,113

4 Claims. (Cl. 219—10)

This invention relates to the fabricating of lined nozzles for pressure vessels such as oil cracking stills.

An object of the invention is to provide for an unbroken corrosion resisting interior for still nozzles.

A further object is to provide for lining nozzles of small diameters.

In the oil cracking processes certain crude oils bearing sulphur are difficult to handle because of the highly corrosive effect of the sulphur compounds on the ferrous metals from which cracking stills are generally built. The temperatures to which the charges are raised are ideal for corrosion, and the pressures used make corrosion not a mere disadvantage, but a hazard to the workmen.

Corrosion is particularly prevalent where the corrosive fluids circulate, such as in and about the nozzles. The present invention concerns itself with protection of these areas.

Where nozzles are constructed by welding, those of small diameter must be welded from the outside, since there is not room within the nozzle to insert a weldrod and hold it at the proper angle to insure a good weld.

The difficulty of making a lined nozzle arises because the thin imperforate liner must be welded with a special corrosion resisting alloy.

The present invention provides for constructing such a nozzle in a rapid and efficient manner.

Figure 1:
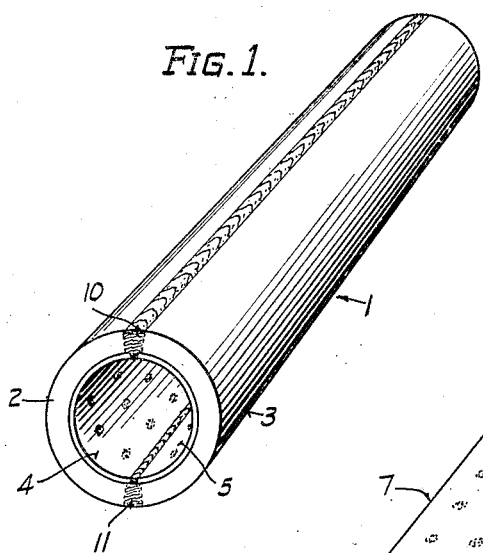
Figure 1 is a perspective view of a nozzle constructed in accordance with my invention.
Figure 2:
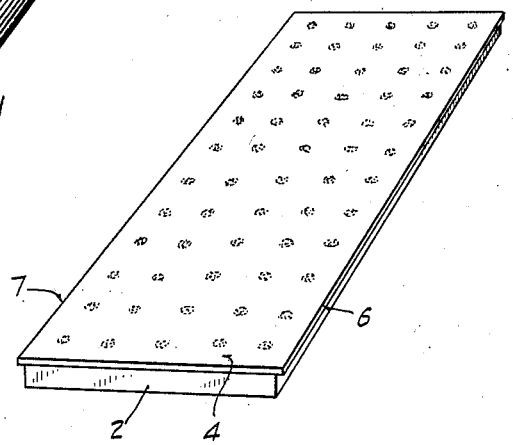
Fig. 2 is a perspective view showing the base plate and liner preparatory to shaping.
Figure 3:
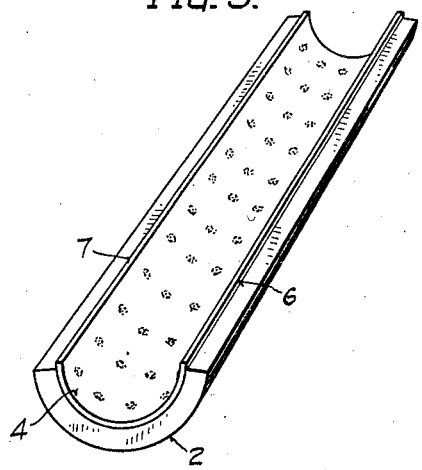
Fig. 3 is a perspective view showing the plate and liner after they have been shaped.

The nozzle 1 is constructed of two half shells 2 and 3 of relatively thick plate. The liner similarly is constructed of relatively thin half shells 4 and 5 of corrosion resisting metal such as chrome-steel. Each plate, as shown in Fig. 2, is of slightly narrower dimension than the liner. The plate is placed in a horizontal position and the liner placed thereover with the edges 6 and 7 extending approximately an equal distance beyond the corresponding side edges of the plate. In this position the liner sheet 4 is spot welded at frequent intervals to the plate 2. Thereafter the composite sheet is formed into a half shell, as shown in Fig. 3.

Figure 4:
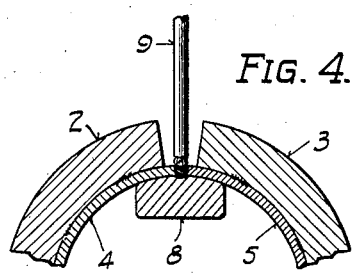
Fig. 4 is a transverse sectional view showing the grooves for receiving the weld metal.
Figure 5:
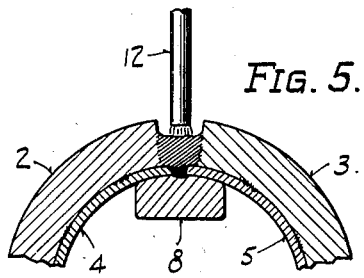
Fig. 5 is a view similar to Fig. 4 showing a deposit of weld metal in the groove.

A pair of half shells are placed face to face, as shown in Fig. 4, to form a cylinder, the meeting edges of the liner sheets 4 and 5 being placed in accurate alignment and held in position for welding. The liner sheets 4 and 5 are relatively thin; first, because of the cost of the liner material; and second, because if thicker sheets were used, great stresses would be set up upon changes in temperature. The welding of these sheets, which seldom exceed one-eighth of an inch in thickness, demands care since the burning of the metal might cause a leak in the liner and permit the corrosive fluids to attack the ferrous metal beneath. Consequently, it is advisable to employ an efficient chill 8 on the seam to be welded.

The purpose of employing liner material of greater lateral dimensions than the plate itself is to expose the liner for welding and further to create a welding groove between the edges of the plate when the meeting edges of the liner are held in position.

If the liner were of the same dimensions as the plate, it would be difficult to be assured that the welding metal deposited at the bottom of the groove had fused and joined with the liner material and left an unbroken protected surface. Where the liner is exposed, as in Fig. 4, the weld may be accomplished from the exterior, since, as explained above, all welding must be performed from the outside due to the dimensions of the nozzle.

The welding, by means of which the liner is fabricated to produce an unbroken surface of corrosion resisting metal, is accomplished by welding with a chromium alloy weldrod 9. Deposited metal fuses with the edges of the liner sheets and is chilled by a welding chill 8, solidifies, and forms a composite structure. After the liner has been welded for the full length of both seams 10 and 11, the plates 2 and 3 are welded together, this time by a weldrod 12 of ferrous metal. The chill is maintained in the same position to prevent the first pass of the weldrod 12 from penetrating the liner. When the grooves at the seams 10 and 11 have been completely filled with ferrous metal, the lined nozzle 1 has been completed.

While a specific description of the operation performed in constructing a nozzle according to the present invention has been set forth above, it will be understood that various departures may be made from this procedure without departing from the spirit and scope of the appended claims.

I claim:

1. The method of fabricating lined nozzles which comprises providing corrosion resisting liner sheets and steel plates, said sheets being wider than the plates, welding the sheets to the plates with their side edges extending beyond those of the plates, forming the composite plate into a half shell, arranging a pair of half shells with the liner edges in alignment forming a groove between the adjacent edges of the plates, depositing corrosion resisting metal along the seams to weld the liner, and thereafter welding the plates with ferrous metal.

2. The method of making lined nozzles which comprises attaching corrosion resisting liner sheets to steel plates of smaller area in such manner that the edges of the liner project beyond the plate, bending the plate about a longitudinal axis to conform to an arc of a circle, assembling the lined plates to form a cylinder with the liners in alignment, welding the meeting edges of the liner sheets with a weldrod of the same composition of material and then welding the steel plates.

3. The method of fabricating lined articles of manufacture which comprises providing thick metal plates and corrosion resisting liner sheets of predetermined sizes, the liner sheets being larger than the thick metal plates, forming the plates and sheets into shapes adapted to be utilized in fabricating the article of manufacture, arranging pairs of plates and sheets in juxtaposition with the edges of the liner sheets in alignment, the plates and sheets being in superimposed relation with the sheets extending beyond the plates whereby when pairs of sheets and plates are juxtaposed the edges of the plates and the outer portions of the sheets form a welding groove, depositing by means of an electric arc corrosion resistant metal along the seam between the liner sheets to weld them together, and thereafter welding the plates with ferrous metal.

4. The method of fabricating lined nozzles which comprises providing thick metal plates and corrosion resistant liner sheets of predetermined sizes, the liner sheets being larger than the thick metal plates, shaping the liner sheets and plates to conform to an arc of a circle to adapt them to be utilized in fabricating the nozzle, disposing the plates and sheets in pairs in juxtaposed relation with the liner sheets in alignment, the plates and sheets being in superimposed relation, the sheets extending beyond the plates whereby the outer portions of the sheets and the edges of the plates form welding grooves when juxtaposed, welding the liner sheets with corrosion resistant metal, and thereafter welding the plates to one another with ferrous metal.

SUNE HERMANSON.